US012559077B2

(12) United States Patent (10) Patent No.: US 12,559,077 B2
Kim (45) Date of Patent: Feb. 24, 2026

(54) ELECTRIC BRAKE SYSTEM AND METHOD OF CONTROLLING THE SAME

(71) Applicant: HL MANDO CORPORATION, Pyeongtaek-si (KR)

(72) Inventor: Sukku Kim, Seongnam-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 421 days.

(21) Appl. No.: 18/128,312

(22) Filed: Mar. 30, 2023

(65) Prior Publication Data

US 2023/0311830 A1 Oct. 5, 2023

(30) Foreign Application Priority Data

Mar. 30, 2022 (KR) ........................ 10-2022-0039690

(51) Int. Cl.
*B60T 13/58* (2006.01)
*B60T 8/1755* (2006.01)
*B60T 17/22* (2006.01)

(52) U.S. Cl.
CPC ............ *B60T 13/58* (2013.01); *B60T 8/1755* (2013.01); *B60T 17/22* (2013.01); *B60T 2270/306* (2013.01); *B60T 2270/88* (2013.01)

(58) Field of Classification Search
None
See application file for complete search history.

(56) References Cited

U.S. PATENT DOCUMENTS 10,351,113 B2 7/2019 Mannherz et al.

FOREIGN PATENT DOCUMENTS

| | | | | |
|---|---|---|---|---|
| CN | 111936361 A | * | 11/2020 | ............ B60T 13/741 |
| JP | H11-59407 A | | 3/1999 | |
| JP | 2009-190504 A | | 8/2009 | |
| JP | 6227333 B2 | * | 11/2017 | .............. B60T 7/042 |
| JP | 6839892 B2 | * | 3/2021 | |
| KR | 10-1717552 B1 | | 3/2017 | |
| KR | 10-2019-0126578 A | | 11/2019 | |

OTHER PUBLICATIONS

CN-111936361-A: English Machine Translation (Year: 2020).*
JP-6839892-B2: English Machine Translation (Year: 2021).*
JP-6227333-B2: English Machine Translation (Year: 2017).*
Office Action issued on Aug. 19, 2025, for corresponding Korean Patent Application No. 10-2022-0039690, along with an English machine translation (10 pages).

* cited by examiner

*Primary Examiner* — Melanie Torres Williams
(74) *Attorney, Agent, or Firm* — Hauptman Ham, LLP

(57) ABSTRACT

Disclosed herein is an electric brake system including a brake including a cylinder and a piston which is provided in the cylinder to move forward or backward and is moved by hydraulic pressure so that a brake pad presses a brake disc, an electric stability control (ESC) actuator configured to generate and supply hydraulic pressure to the cylinder to brake a wheel of a vehicle, an electric parking brake (EPB) actuator configured to move the piston by a motor, and a controller configured to control the EPB actuator and the ESC actuator, wherein the controller estimates a flux in the cylinder and estimates pressure in the cylinder based on whether an EPB is applied through driving of the EPB actuator and the estimated flux in the cylinder.

10 Claims, 5 Drawing Sheets

300

START

ACQUIRE DRIVING INFORMATION
OF ESC ACTUATOR    310

ESTIMATE INFLOW
FLUX INTO CYLINDER    320

ESTIMATE CURRENT
FLUX IN CYLINDER    330

ACQUIRE DRIVING INFORMATION
OF EPB ACTUATOR    340

350
IS EPB APPLIED?    YES

NO

ESTIMATE PRESSURE BASED ON
FIRST MAPPING INFORMATION    361

ESTIMATE PRESSURE BASED ON
SECOND MAPPING INFORMATION    362

RETURN

ELECTRIC BRAKE SYSTEM AND METHOD OF CONTROLLING THE SAME

CROSS-REFERENCE TO RELATED APPLICATION

This application claims the benefit of Korean Patent Application No. 10-2022-0039690, filed on Mar. 30, 2022 in the Korean Intellectual Property Office, the disclosure of which is incorporated herein by reference.

BACKGROUND

1. Field

Embodiments of the present disclosure relate to an electric brake system and a method of controlling the same, and more particularly, to an electric brake system which is an electric brake system of a motor-on-caliper specification in which an actuator of an electric parking brake is mounted on a caliper and estimates pressure in a cylinder according to whether the electric parking brake is driven, and a method of controlling the same.

2. Description of the Related Art

In conventional brake apparatuses, when a driver steps on a brake pedal, hydraulic pressure formed in a master cylinder is transferred to a wheel cylinder provided in each wheel in order to generate a braking action which converts kinetic energy of each wheel into thermal energy so that a vehicle is decelerated or stopped.

In this case, an electronically controlled brake apparatus has generally been applied to the conventional brake apparatus in order for the efficiency and reliability of braking.

In a braking situation, such a conventional electronically controlled brake apparatus estimates a discharge flux of a motor pump generated by a suctioning operation of the motor pump and estimates pressure in a wheel cylinder for braking.

Recently, the use of a brake for braking a vehicle as well as an electric parking brake (EPB) has increased, and in particular, an electric parking brake system of a motor-on-caliper (MOC) specification in which an EPB actuator is integrated with a caliper in order for applying an EPB has been used.

In an electric brake system to which an electric parking brake of an MOC specification is applied, when an EPB is applied, a volume of a cylinder changes due to a forward movement of a piston, and even when the volume of the cylinder changes in this way, when pressure of a wheel cylinder is estimated, there is a problem that an error occurs as in the related art.

SUMMARY

Therefore, it is an aspect of the present disclosure to provide an electric brake system which is an electric brake system of a motor-on-caliper specification in which an actuator of an electric parking brake is mounted on a caliper and estimates pressure in a cylinder according to whether the electric parking brake is driven, and a method of controlling the same.

Additional aspects of the disclosure will be set forth in part in the description which follows and, in part, will be obvious from the description, or may be learned by practice of the disclosure.

In accordance with one aspect of the present disclosure, an electric brake system includes a brake including a cylinder and a piston which is provided in the cylinder to move forward or backward and is moved by hydraulic pressure so that a brake pad presses a brake disc, an electric stability control (ESC) actuator configured to generate and supply hydraulic pressure to the cylinder to brake a wheel of a vehicle, an electric parking brake (EPB) actuator configured to move the piston by a motor, and a controller configured to control the EPB actuator and the ESC actuator, wherein the controller estimates a flux in the cylinder and estimates pressure in the cylinder based on whether an EPB is applied through driving of the EPB actuator and the estimated flux in the cylinder.

When the EPB is not applied, the controller may estimate the pressure in the cylinder from the flux in the cylinder based on first mapping information stored in advance, and when the EPB is applied, the controller may estimate the pressure in the cylinder from the flux in the cylinder based on second mapping information stored in advance.

The controller may estimate the flux in the cylinder based on driving information of the ESC actuator.

The controller may estimate an inflow flux flowing into the cylinder based on the driving information of the ESC actuator and may add the inflow flux to a flux in the cylinder before inflow to estimate the flux in the cylinder.

The electric brake system may be provided on each of a left rear wheel and a right rear wheel of the vehicle to brake the left rear wheel and the right rear wheel of the vehicle.

In accordance with another aspect of the present disclosure, a method of controlling an electric brake system, which includes a piston moved by hydraulic pressure so that a brake pad presses a brake disc, a cylinder in which the piston is provided to move forward or backward, an electric stability control (ESC) actuator configured to generate and supply hydraulic pressure to the cylinder, and an electric parking brake (EPB) actuator configured to move the piston by a motor so that the brake pad presses the brake disc, includes estimating a flux in the cylinder and estimating pressure in the cylinder based on whether an EPB is applied through driving of the EPB actuator and the estimated flux in the cylinder.

The estimating of the pressure in the cylinder may include, when the EPB is not applied, estimating the pressure in the cylinder from the flux in the cylinder based on first mapping information stored in advance, and when the EPB is applied, estimating the pressure in the cylinder from the flux in the cylinder based on second mapping information stored in advance.

The estimating of the flux in the cylinder may include estimating the flux in the cylinder based on driving information of the ESC actuator.

The estimating of the flux in the cylinder may include estimating an inflow flux flowing into the cylinder based on the driving information of the ESC actuator, and adding the inflow flux to a flux in the cylinder before inflow to estimate the flux in the cylinder.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
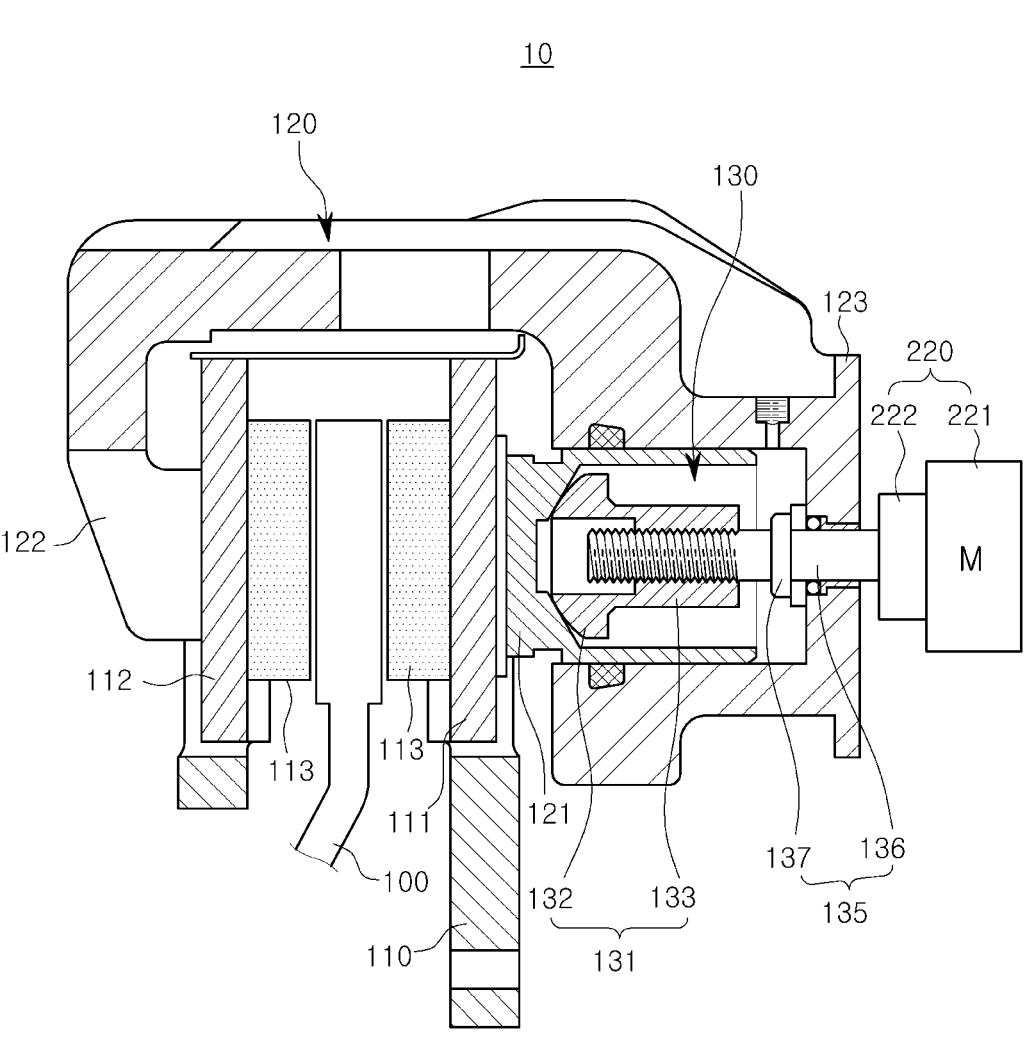
FIG. 1 illustrates an electric brake applied to an electric brake system according to an embodiment.

Like reference numerals refer to like elements throughout the specification. Not all elements of embodiments of the present disclosure will be described, and description of what are commonly known in the art or what overlap each other in the embodiments will be omitted. Terms as used throughout the specification, such as "part," "module," "member," and "block," may be implemented in software and/or hardware, and a plurality of "parts," "modules," "members," or "blocks" may be implemented in a single element, or a single "part," "module," "member," or "block" may include a plurality of elements.

It will be understood that when an element is referred to as being "connected" to another element, it can be directly or indirectly connected to another element, wherein the indirect connection includes "connection via a wireless communication network."

In addition, when a part "includes" or "comprises" an element, unless there is a particular description contrary thereto, the part may further include other elements, not excluding the other elements.

The terms "first," "second," and the like are used to distinguish a certain element from another element, but elements should not be construed as being limited by the terms.

A singular expression includes a plural expression unless the context clearly indicates otherwise.

An identifier is used for convenience of the description but is not intended to illustrate the order of operations. The operations may be implemented in an order different from the illustrated order unless the context clearly indicates otherwise.

The principle and embodiments of the present disclosure will now be described with reference to the accompanying drawings.

FIG. 1 illustrates an electric brake applied to an electric brake system according to an embodiment.

Referring to FIG. 1, an electric brake 10 may include a carrier 110 in which a pair of pad plates 111 and 112 are installed to move forward or backward so as to press a brake disc 100 rotating together with a wheel of a vehicle, a caliper housing 120 slidably installed on the carrier 110 and provided with a cylinder 123 in which a piston 121 is installed to move forward or backward by brake hydraulic pressure, a power conversion unit 130 which presses the piston 121, and an electric parking brake (EPB) actuator 220 which transmits a rotational force to the power conversion unit 130 using a motor M.

The pair of pad plates 111 and 112 are divided into an inner pad plate 111 disposed in contact with the piston 121 and an outer pad plate 112 disposed in contact with a finger portion 122 of the caliper housing 120. The pair of pad plates 111 and 112 are installed in the carrier 110 fixed to a vehicle body so as to move forward or backward with respect to both side surfaces of the brake disc 100. In addition, a brake pad 113 is attached to one surface of each of the pad plates 111 and 112 facing the brake disc 100.

The caliper housing 120 is slidably installed on the carrier 110. More specifically, the caliper housing 120 includes a cylinder 123 in which the power conversion unit 130 is installed at a rear portion thereof and the piston 121 is embedded to move forward or backward, and the finger portion 122 molded to be bent downward from a front portion thereof so as to operate the outer pad plate 112. The finger portion 122 and the cylinder 123 are integrally formed.

The piston 121 is provided in a cylindrical shape with a cup-shaped interior and is slidably inserted into the cylinder 123. The piston 121 presses the inner pad plate 111 toward the brake disc 100 by an axial force of the power conversion unit 130 receiving a rotational force of the EPB actuator 220. Accordingly, when the axial force of the power conversion unit 130 is applied, the piston 121 moves toward the inner pad plate 111 and presses the inner pad plate 111, by a reaction force, the caliper housing 120 operates in a direction opposite to the piston 121, and the finger portion 122 presses the outer pad plate 112 toward the brake disc 100, thereby performing braking.

The power conversion unit 130 may serve to press the piston 121 toward the inner pad plate 111 by receiving a rotational force from the EPB actuator 220.

The power conversion unit 130 may include a nut member 131 installed to be disposed in the piston 121, and a spindle member 135 screw-coupled to the nut member 131.

The nut member 131 may be disposed in the piston 121 in a state of being restricted from rotating and may be screw-coupled to the spindle member 135.

The nut member 131 may include a head portion 132 provided in contact with the piston 121 and a coupling portion 133 formed to extend from the head portion 132 and having a female thread formed on an inner circumferential surface thereof and screw-coupled to the spindle member 135.

The nut member 131 moves forward or backward according to a rotation direction of the spindle member 135, thereby serving to press the piston 121 and release the press applied to the piston 121. In this case, a forward direction may be a moving direction in which the nut member 131 approaches the piston 121. A backward direction may be a moving direction in which the nut member 131 moves away from the piston 121. In addition, the forward direction may be a moving direction in which the piston 121 approaches the brake pad 113. The backward direction may be a moving direction in which the piston 121 moves away from the brake pad 113.

The spindle member 135 may include a shaft 136 that passes through a rear portion of the caliper housing 120 and rotates by receiving the rotational force of the EPB actuator 220 and a flange 137 extending in a radial direction from the shaft 136. One side of the shaft 136 may be rotatably installed to pass through the rear portion of the cylinder 123, and the other side thereof may be disposed in the piston 121. In this case, one side of the shaft 136 passing through the cylinder 123 is connected to an output shaft of a reducer 222 to receive the rotational force of the EPB actuator 220.

The EPB actuator 220 may include a motor 221 and the reducer 222.

The motor 221 may rotate the spindle member 135 to move the nut member 131 forward or backward, thereby pressing the piston 121 or releasing the press applied to the piston 121.

The reducer 222 may be provided between an output side of the motor 221 and the spindle member 135.

Since the electric brake 10 has such a configuration, when an EPB is applied, the spindle member 135 may be rotated in one direction using the EPB actuator 220 to move the nut member 131 and press the piston 121. The piston 121 pressed by the movement of the nut member 131 presses the inner pad plate 111 to bring the brake pad 113 into close contact with the brake disc 100, thereby performing a coupling operation of generating a coupling force.

In addition, in the electric brake 10, when parking is released, the spindle member 135 may be rotated in an opposite direction using the EPB actuator 220 so that the nut member 131 pressed against the piston 121 may be moved backward. The press applied to the piston 121 may be released by the backward movement of the nut member 131. When the press applied to the piston 121 is released, the brake pad 113 is separated from the brake disc 100, thereby performing a coupling release operation of releasing the generated coupling force.

Figure 2:
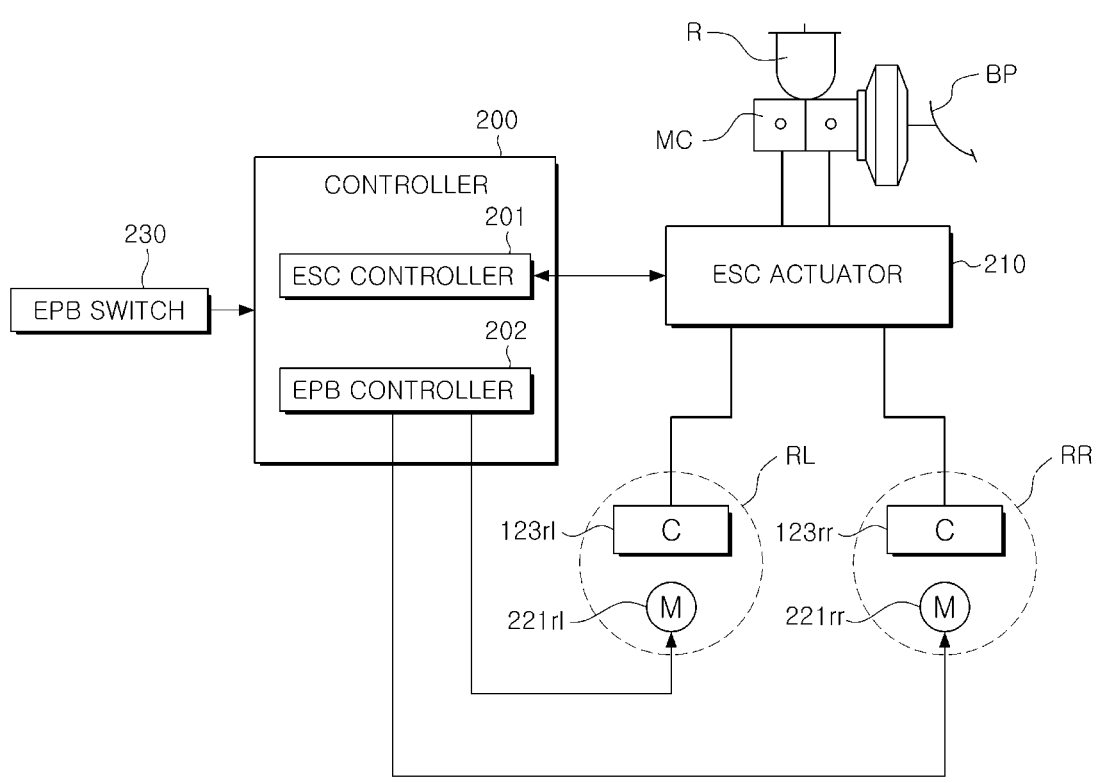
FIG. 2 is a schematic block diagram illustrating an electric brake system according to an embodiment.

FIG. 2 is a schematic block diagram illustrating an electric brake system according to an embodiment.

Referring to FIG. 2, electric brakes 10 may be provided on left and right rear wheels RL and RR of a vehicle.

The electric brake system may include the electric brake 10, a controller 200, an electric stability control (ESC) actuator 210, and an EPB actuator 220.

The controller 200 may be referred to as an electronic control unit (ECU).

The controller 200 may include a processor and a memory. The processor may control the overall operation of the electric brake system. The memory may store programs for the operation or control of the processor and various types of data for operating the electric brake system. The memory may include not only volatile memories such as a static random access memory (SRAM) and a dynamic random access memory (DRAM) but also non-volatile memories such as a flash memory, a read only memory (ROM), and an erasable programmable read only memory (EPROM), and the like.

The controller 200 may include an ESC controller 201 that controls the operation of the ESC actuator 210 and an EPB controller 202 that controls the operation of a motor 221 of the electric brake 10. The ESC controller 201 and the EPB controller 202 may be integrated single ECUs or may be separate ECUs connected through a communication interface.

The ESC actuator 210 may generate and supply hydraulic pressure to cylinders 123_rl_ and 123_rr_ of electric brakes 10_rl_ and 10_rr_ of the left and right rear wheels RL and RR to brake the left and right rear wheels RL and RR.

The ESC actuator 210 is connected to a master cylinder MC coupled to a reservoir R for storing brake oil through a brake pipe.

The ESC actuator 210 is connected to the cylinder 123_rl_ of the electric brake 10_rl_ of the left rear wheel RL and the cylinder 123_rr_ of the electric brake 10_rr_ of the right rear wheel RR through brake pipes.

The ESC actuator 210 may include an opening/closing valve that adjusts brake hydraulic pressure supplied to the cylinders 123_rl_ and 123_rr_ during braking control and a hydraulic pressure circuit that supplies brake hydraulic pressure generated by the master cylinder MC to the cylinders 123_rl_ and 123_rr_ or generates brake hydraulic pressure using a hydraulic pressure generator such as a motor pump or a hydraulic piston to supply the generated brake hydraulic pressure to the cylinders 123_rl_ and 123_rr_.

By operating a brake pedal BP, the ESC actuator 210 having such a configuration supplies the brake hydraulic pressure generated by the master cylinder MC to the cylinders 123_rl_ and 123_rr_. The ESC actuator 210 drives the opening/closing valve as needed or supplies the brake hydraulic pressure generated by the hydraulic pressure circuit to the cylinders 123_rl_ and 123_rr_ and drives the opening/closing valve as needed to generate a braking force required for the wheel. The brake hydraulic pressure supplied to the cylinders 123_rl_ and 123_rr_ presses a piston 121 to bring the brake pad 113 into close contact with a brake disc 100, thereby generating a braking force on the left and right rear wheels RL and RR.

The EPB switch 230 may be a switch for receiving a driver's intention to operate the EPB actuator of the electric brake 10 and may be provided near a driver seat of the vehicle.

The EPB switch 230 is provided to be turned on or off by a driver.

When turned on, the EPB switch 230 transmits a signal, which corresponds to an EPB applying command, which is a parking operation command, to the controller 200. When turned off, the EPB switch 230 transmits a signal, which corresponds to an EPB releasing command, which is a parking release command, to the controller 200.

The controller 200 may perform an EPB applying mode for applying the electric brake 10 or an EPB releasing mode based on a signal for operating the EPB switch 230 operated by a driver or an operation signal generated by a program related to the operation of an EPB.

During the EPB applying mode, the controller 200 rotates motors 221_rl_ and 221_rr_ in one direction to move the nut member 131 in a forward direction and press the piston 121, thereby applying the EPB which generates a coupling force by bringing the brake pad 113 into close contact with the brake disc 100.

During the EPB releasing mode, the controller 200 rotates the motors 221_rl_ and 221_rr_ in a reverse direction to move the nut member 131 in a backward direction and release the press applied to the piston 121, thereby releasing the EPB which release the generated coupling force by releasing close contact of the brake pad 113 in close contact with the brake disc 100.

The controller 200 may estimate pressure in the cylinder 123.

The controller 200 may estimate a flux in the cylinder 123 and may estimate pressure in the cylinder 123 based on whether the EPB is applied through driving of the EPB actuator 220 and the estimated flux in the cylinder 123.

The controller 200 may estimate a flux in the cylinder 123 based on driving information of the ESC actuator 210. Specifically, the controller 200 may estimate an inflow flux flowing into the cylinder 123 based on the driving information of the ESC actuator 210 and may add the inflow flux to a flux in the cylinder before inflow to estimate a flux in the cylinder 123.

The controller 200 may store inflow flux model information for estimating an inflow flux flowing into the cylinder 123 according to driving of the ESC actuator 210 based on driving information of the ESC actuator 210. As an example, the controller 200 may store flux information according to driving of a hydraulic pressure generator such as a motor pump of the ESC actuator 210 and may estimate an inflow flux based on a driving speed and driving time of the hydraulic pressure generator.

Meanwhile, the controller 200 may store the estimated flux in the cylinder 123 and may continuously accumulate a flux flowing into the cylinder 123 to estimate a current flux in the cylinder 123.

The controller 200 may estimate pressure in the cylinder 123 based on the estimated flux in the cylinder 123. A volume of the cylinder 123 changes according to the movement of the piston 121, when the piston 121 moves forward, the cylinder 123 presses the brake pad 113 through an inner pad plate 111, and the brake pad 113 presses the brake disc 100. Pressure in the cylinder 123 may be changed according to such movement and pressurization of the piston 121 and may be determined according to a flux in the cylinder 123. The controller 200 may store the flux in the cylinder 123 and mapping information of the pressure in the cylinder 123 and may estimate the pressure in the cylinder 123 based on the mapping information and the flux in the cylinder 123.

Meanwhile, the controller 200 may change mapping information for estimating a flux in the cylinder 123 according to whether the EPB is applied through driving of the EPB actuator.

When the EPB is not applied, the controller 200 may estimate pressure in the cylinder 123 from a flux in the cylinder 123 based on first mapping information stored in advance. When the EPB is applied, the controller 200 may estimate pressure in the cylinder 123 from a flux in the cylinder 123 based on second mapping information stored in advance.

Figure 3:
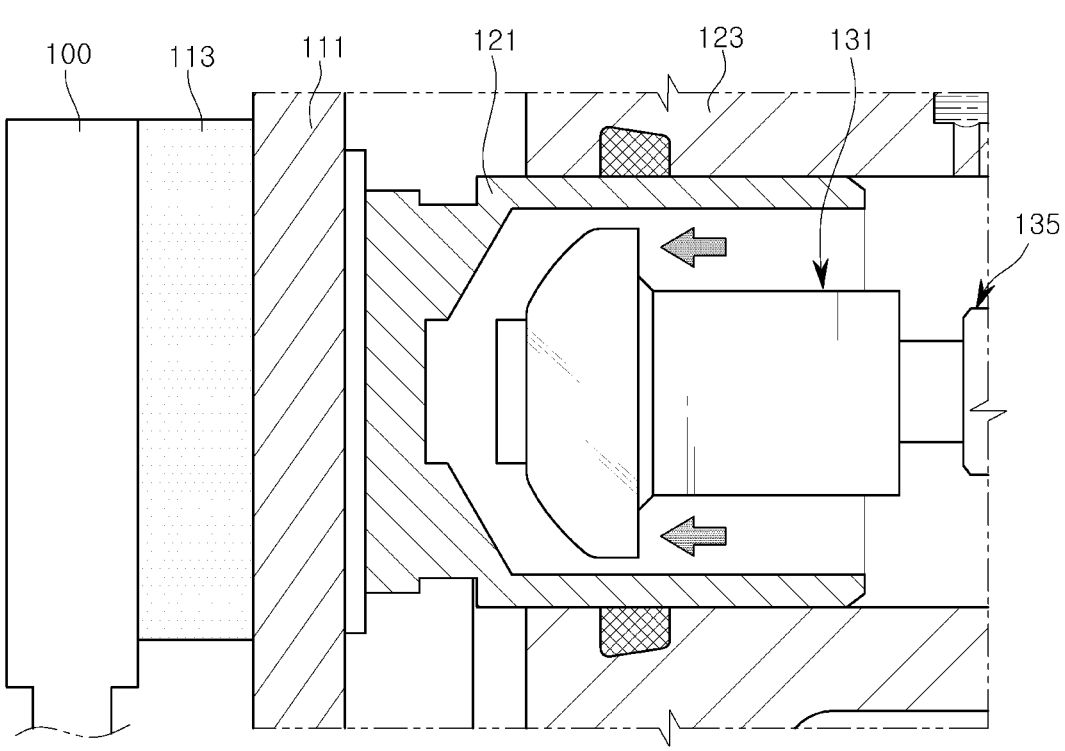
FIG. 3 illustrates an electric stability control (ESC) braking operation of an electric brake system according to an embodiment.

FIG. 3 illustrates an ESC braking operation of an electric brake system according to an embodiment. Referring to FIG. 3, it is possible to confirm an electric brake 10 in a state in which an EPB is not applied. When the EPB is not applied, a controller 200 rotates a spindle member 135 using an EPB actuator 220 and allows a nut member 131 to move to a backward position.

As described above, when the nut member 131 is placed at the backward position, and the ESC braking operation is performed, the controller 200 controls an ESC actuator 210 to supply brake hydraulic pressure generated by a hydraulic pressure circuit to a cylinder 123 (indicated by a thick arrow), thereby generating a braking force required for wheels.

In this case, the controller 200 may estimate an inflow flux flowing into the cylinder 123 based on driving information of the ESC actuator 210 and may add the inflow flux to a flux previously estimated in the cylinder to estimate a current flux in the cylinder 123.

When the current flux in the cylinder 123 is estimated, the controller 200 may estimate pressure in the cylinder 123 from the flux in the cylinder 123 based on first mapping information stored in advance.

Figure 4:
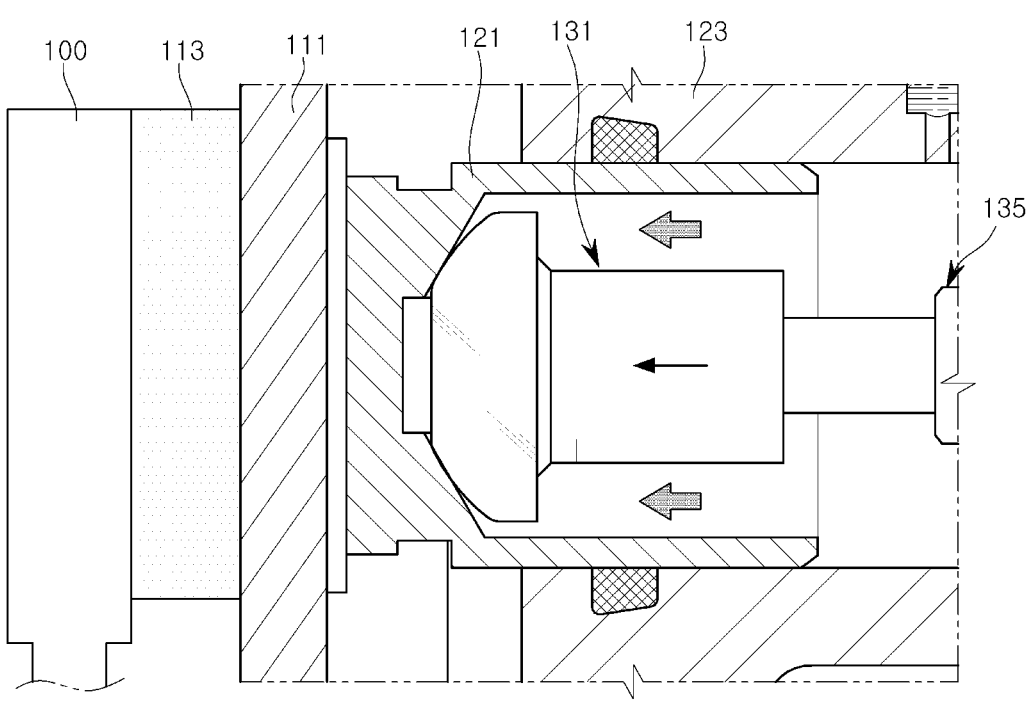
FIG. 4 illustrates an electric parking brake (EPB) applying operation of an electric brake system according to an embodiment.

Meanwhile, FIG. 4 illustrates an EPB applying operation of an electric brake system according to an embodiment. Referring to FIG. 4, it is possible to confirm an electric brake 10 in a state in which an EPB is applied. When the EPB is applied, a controller 200 rotates a spindle member 135 using an EPB actuator 220 and allows a nut member 131 to move to a forward position so that the piston 121 presses an inner pad plate 111.

As the piston 121 moves forward due to the forward movement of the nut member 131, a volume of a cylinder 123 changes, and as the volume of the cylinder 123 changes, a correlation between a flux in the cylinder 123 and pressure in the cylinder also changes.

As described above, even when the EPB is applied, when pressure in the cylinder 123 is estimated based on first mapping information representing a correlation between a flux in the cylinder 123 and pressure in the cylinder 123 in a state in which the EPB is not applied, an error in an estimated value may increase.

Accordingly, when the EPB is applied, the controller 200 may estimate a current flux in the cylinder 123, and when the current flux in the cylinder is estimated, the controller 200 may estimate pressure in the cylinder 123 from the flux in the cylinder 123 based on second mapping information different from the first mapping information stored in advance. The current flux in the cylinder 123 may be estimated in the same manner as when the EPB is not applied.

A method of estimating pressure in a wheel cylinder of a controller 200 of an electric brake system according to one embodiment of the present disclosure will be described with reference to FIG. 5.

Figure 5:
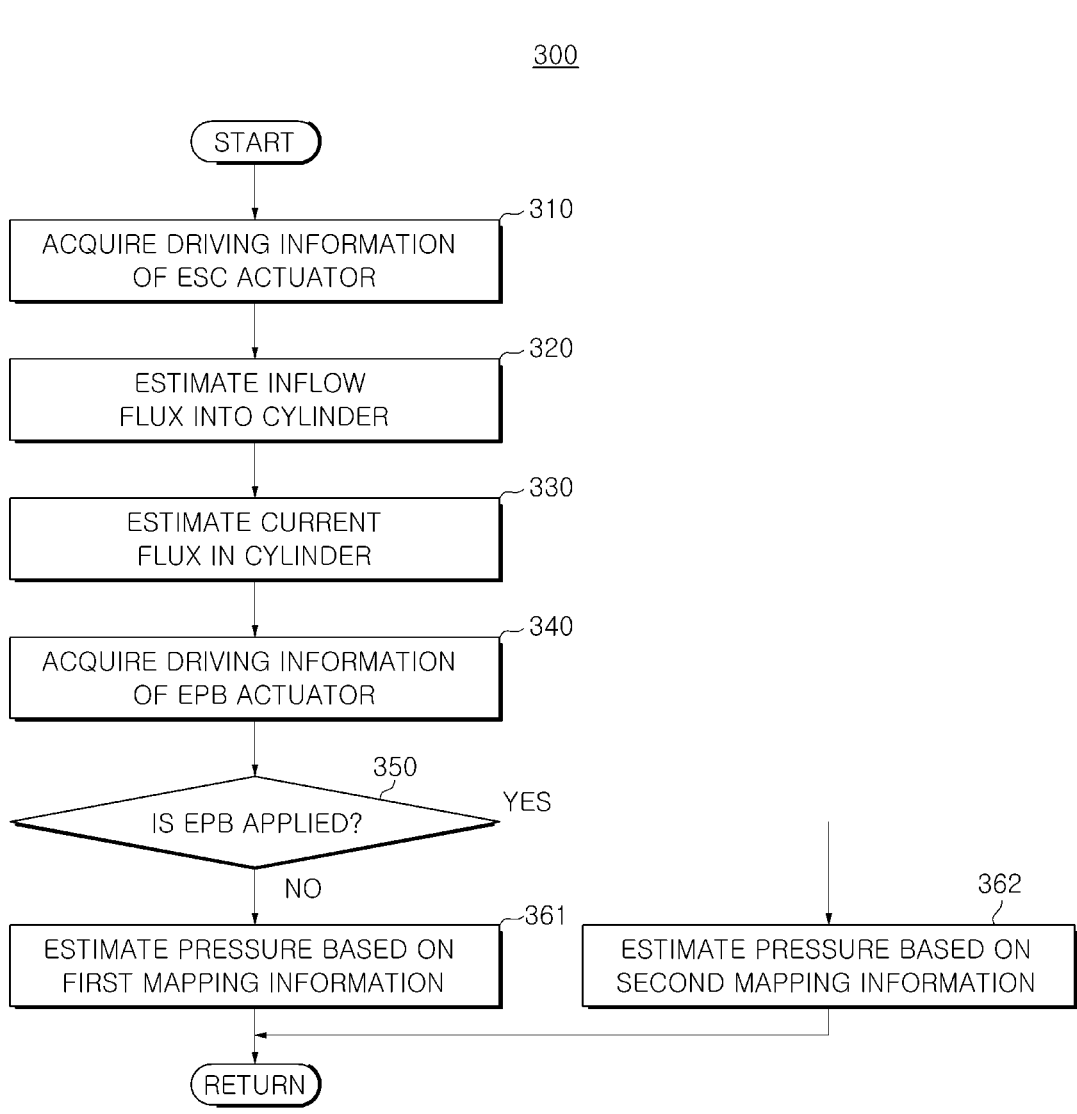
FIG. 5 is a control flowchart of the estimation of pressure in a wheel cylinder of an electric brake system according to an embodiment.

FIG. 5 is a control flowchart of the estimation of pressure in a wheel cylinder of an electric brake system according to an embodiment.

Referring to FIG. 5, a method 300 of controlling an electric brake system according to one embodiment of the present disclosure includes estimating a flux in a cylinder 123, and estimating pressure in the cylinder based on whether an EPB is applied through driving of an EPB actuator 220 and the estimated flux in the cylinder.

In this case, in order to estimate the flux in the cylinder, first, a controller 200 acquires driving information of the ESC actuator 210 (310).

Then, the controller 200 estimates an inflow flux flowing into the cylinder 123 based on the driving information of an ESC actuator 210 (320).

Next, the controller 200 adds the inflow flux to a flux in the cylinder 123 before inflow to estimate a flux in the cylinder (330).

Meanwhile, in order to estimate pressure in the cylinder, first, the controller 200 acquires driving information of the EPB actuator 220 (340).

Thereafter, the controller 200 checks whether the EPB is applied through driving of the EPB actuator 220 (350).

As a result of the check, when the EPB is not applied (NO in 350), the controller 200 estimates the pressure in the cylinder 123 from the flux in the cylinder 123 based on first mapping information stored in advance (361).

On the other hand, as a result of the check, when the EPB is applied (YES in 350), the controller 200 estimates the pressure in the cylinder 123 from the flux in the cylinder 123 based on second mapping information stored in advance (362).

As described above, the method of controlling an electric brake system according to the present disclosure, pressure in the cylinder 123 is estimated by changing mapping information for estimating pressure in the cylinder 123 according to whether the EPB is applied, thereby increasing the accuracy of the estimation.

According to an electric brake system according to an aspect of the present disclosure, by estimating pressure in a wheel cylinder based on whether an EPB is applied, the pressure in the wheel cylinder can be more accurately estimated by reflecting a volume of a cylinder changed according to whether the EPB is applied.

According to an electric brake system according to an aspect of the present disclosure, mapping information used when pressure in a cylinder is estimated is changed according to whether an EPB is applied, thereby reducing an error in estimation of the pressure in the wheel cylinder.

The electric brake system is provided on each of a left rear wheel and a right rear wheel of a vehicle to brake the left rear wheel and the right rear wheel of the vehicle.

The disclosed embodiments have been described above with reference to the accompanying drawings. Those of ordinary skill in the art to which the present disclosure pertains will appreciate that the present disclosure can be carried out in forms different from the disclosed embodiments without changing the technical spirit or essential characteristics of the present disclosure. The disclosed embodiments are exemplary and should not be interpreted as restrictive.

What is claimed is:

1. An electric brake system comprising:

a brake including a cylinder and a piston which is provided in the cylinder to move forward or backward and is moved by hydraulic pressure so that a brake pad presses a brake disc;

an electric stability control (ESC) actuator configured to generate and supply hydraulic pressure to the cylinder to brake a wheel of a vehicle;

an electric parking brake (EPB) actuator configured to move the piston by a motor; and a controller configured to control the EPB actuator and the ESC actuator, wherein the controller is configured to estimate a flux in the cylinder based on driving information of the ESC actuator and estimate pressure in the cylinder based on whether an EPB is applied through driving of the EPB actuator and the estimated flux in the cylinder.

2. The electric brake system of claim 1, wherein:

when the EPB is not applied, the controller is configured to estimate the pressure in the cylinder from the flux in the cylinder based on first mapping information stored in advance; and when the EPB is applied, the controller is configured to estimate the pressure in the cylinder from the flux in the cylinder based on second mapping information stored in advance.

3. The electric brake system of claim 1, wherein the controller is configured to estimate an inflow flux flowing into the cylinder based on the driving information of the ESC actuator and add the inflow flux to a flux in the cylinder before inflow to estimate the flux in the cylinder.

4. The electric brake system of claim 1, wherein the electric brake system is provided on each of a left rear wheel and a right rear wheel of the vehicle to brake the left rear wheel and the right rear wheel of the vehicle.

5. The electric brake system of claim 2, wherein mapping information indicates a correlation between a flux in the cylinder and a pressure in the cylinder.

6. The electric brake system of claim 1, wherein the controller is configured to acquire driving information of the EPB actuator to estimate the pressure in the cylinder.

7. A method of controlling an electric brake system including a piston moved by hydraulic pressure so that a brake pad presses a brake disc, a cylinder in which the piston is provided to move forward or backward, an electric stability control (ESC) actuator configured to generate and supply hydraulic pressure to the cylinder, and an electric parking brake (EPB) actuator configured to move the piston by a motor so that the brake pad presses the brake disc, the method comprising:

estimating a flux in the cylinder based on driving information of the ESC actuator; and estimating pressure in the cylinder based on whether an EPB is applied through driving of the EPB actuator and the estimated flux in the cylinder.

8. The method of claim 7, wherein the estimating of the pressure in the cylinder includes:

when the EPB is not applied, estimating the pressure in the cylinder from the flux in the cylinder based on first mapping information stored in advance; and when the EPB is applied, estimating the pressure in the cylinder from the flux in the cylinder based on second mapping information stored in advance.

9. The method of claim 7, wherein the estimating of the flux in the cylinder includes:

estimating an inflow flux flowing into the cylinder based on the driving information of the ESC actuator; and adding the inflow flux to a flux in the cylinder before inflow to estimate the flux in the cylinder.

10. The method of claim 7, wherein the electric brake system is provided on each of a left rear wheel and a right rear wheel of the vehicle to brake the left rear wheel and the right rear wheel of the vehicle.

* * * * *